Figure 1:
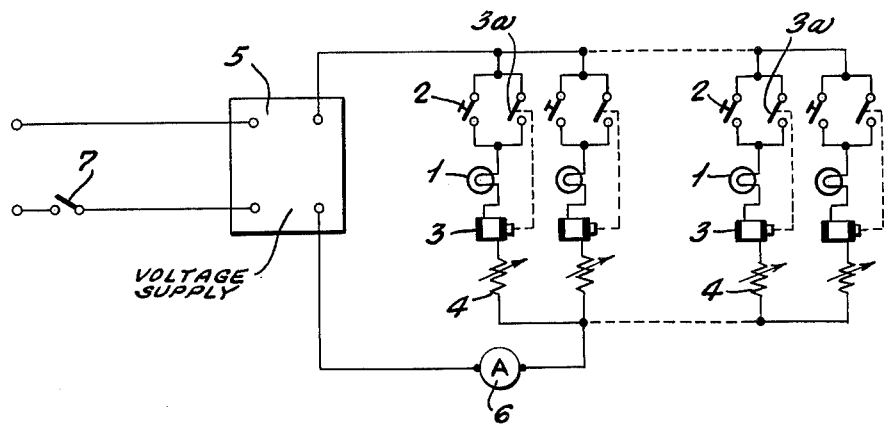

June 28, 1966  A. A. VISHNEVSKY ET AL  3,258,006
UNIT FOR DETERMINING THE BURN AREA
Filed June 10, 1963   2 Sheets-Sheet 1

INVENTORS:
A. A. VISHNEVSKY
S. N. BRINES
M. I. SHRIBER
V. L. BRAILOVSKY
E. N. VAGNER
I. B. MOOCHNIK

BY *Glascock, Downing & Seebold*
ATTORNEYS

June 28, 1966   A. A. VISHNEVSKY ETAL   3,258,006
UNIT FOR DETERMINING THE BURN AREA
Filed June 10, 1963   2 Sheets-Sheet 2

INVENTORS:
A.A. VISHNEVSKY
S.N. BRINES
M.I. SHRIBER
V.L. BRAILOVSKY
E.N. VAGNER
I.B. MOOCHNIK

BY Glascock, Downing & Seebold
ATTORNEYS

United States Patent Office 3,258,006
Patented June 28, 1966

3,258,006
UNIT FOR DETERMINING THE BURN AREA
Alexandr Alexandrovich Vishnevsky, Samuil Natanovich Brines, Mikhail Izrailevich Shriber, Victor Lvovich Brailovsky, Eduard Nickolajevich Vagner, and Ilja Borisovich Moochnik, all of Moscow, U.S.S.R., assignors to Institut Khirurgii Vishnevsky
Filed June 10, 1963, Ser. No. 286,800
2 Claims. (Cl. 128—2)

Our invention relates to the field of medicine, and in particular, to the determination of absolute and relative burn area on the human body.

It has previously been proposed to measure the burn area by means of a method according to which the burn area is determined by plotting the contours of the affected sections on a diagram on graph paper, on which the front and rear human silhouettes are drawn and subsequent recalculation of the data obtained is made according to a suitable conversion table.

There is also the prior method according to which the outlines of the burn are plotted on sterile transparent films placed on the burnt surfaces. The absolute burn area is then measured by means of graph paper, while the relative areas (percent of affection) is measured by reference to a suitable chart.

The above enumerated methods possess the following drawbacks: the first method is difficult to use and is not accurate enough (the errors sometimes approach 10 percent of the total body surface); the second method is extremely complicated and often causes traumatization of the injured person and is therefore not commonly used in practice.

Though attempts have been made to overcome the above drawbacks little has been accomplished while we have successfully solved this problem and have accomplished its practical realization.

The proposed invention overcomes the above drawbacks and permits a rapid, direct and automatic calculation of the absolute and relative burn area with a sufficiently high degree of accuracy.

In conformity with the preferred method and its realization, the invention consists of a hollow mannequin, the shell of which is made of transparent material, the surface of which is divided into the desired number of equal surface areas, the number of which depends on the desired accuracy. A separate measuring unit is also provided.

The inner cavity of the mannequin is divided by opaque partitions into a number of cells corresponding to the number of surface areas.

Each of the equal surface areas can be illuminated by an electric lamp disposed in each cell and energized by a suitable switch.

The measurements of the burn areas and the configurations of the burns on the patient's body should correspond to those of the illuminated areas on the mannequin surface; measurements of these areas results in providing absolute and relative units, the values of which are obtained from an appropriately calibrated instrument scale.

The object of this invention is the provision of an apparatus for determining the burn area in absolute and relative units with an adequate degree of accuracy and within a minimum period of time, without resorting to additional calculation.

A further object of this invention is the provision of an apparatus for providing rapid and accurate data indicating the size of burn area in absolute and relative units and eliminating any traumatization of the injured person.

Figure 4:
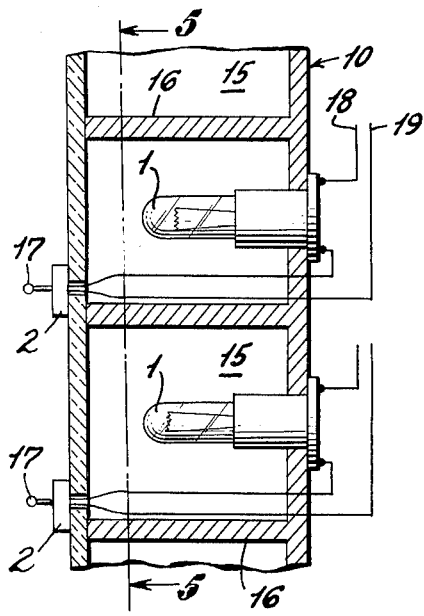
Figure 5:
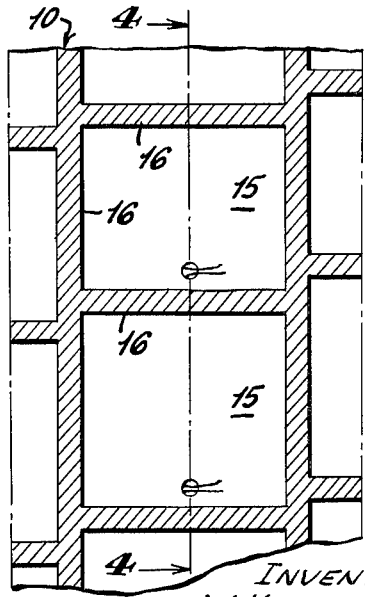
Figure 2:
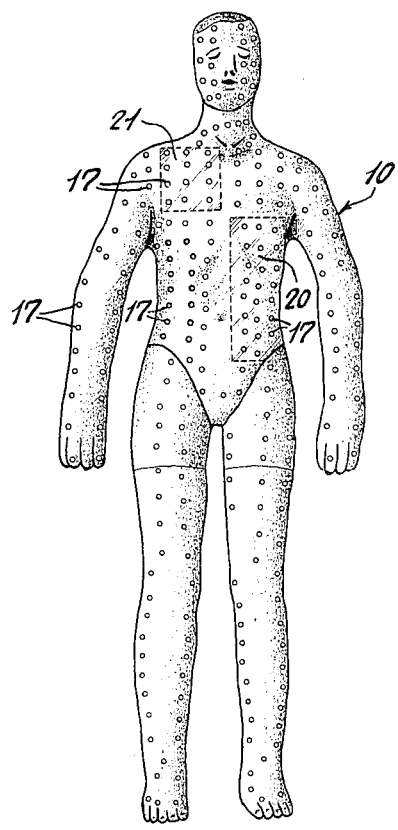
Figure 3:
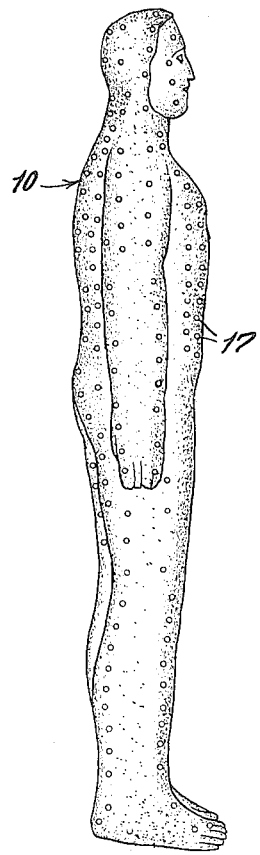

Further objects and advantages of the invention will be apparent from the following description taken in conjunction with the accompanying drawing wherein:

FIG. 1 is a diagrammatic view of the electrical circuit utilized in this invention;

FIG. 2 a front elevational view showing a mannekin utilized in connection with this invention;

FIG. 3 a side elevational view of the mannekin shown in FIG 2;

FIG. 4 a fragmentary sectional view taken substantially on the line 4—4 of FIG. 5 and showing a representative portion of the internal structure of the mannekin of FIG. 2; and FIG. 5 a fragmentary sectional view taken substantially on the lines 5—5 of FIG. 4.

With continued reference to the drawings and particularly FIGS. 2 and 3, there is shown a hollow mannekin 10 constructed of suitable transparent material and such mannekin may have the size and configuration of an average person.

As stated above, the outer walls of the mannekin are transparent and as best shown in FIGS. 4 and 5, the interior of the mannekin adjacent the outer walls is divided into a plurality of cells 15 which are separated by opaque partitions 16 and in each cell 15 there is disposed an electrically energized lamp 1. A switch 2 for each lamp 1 is disposed opposite each cell 15 and each switch 2 is provided with a manually operable switch actuating member 17 projecting outwardly of the exterior wall, of the mannekin 10. The lamp 1 and switch 2 for each cell 15 are connected through suitable electrical conductors 18 and 19 to the electrical circuit shown in FIG. 1. Consequently, actuating a switch 2 to energize the lamp 1 associated therewith will serve to illuminate only that portion of the surface of the mannekin 10 opposite to that particular cell 15 and by illuminating the lamps in a plurality of adjacent cells a particular area of the mannekin 10 may be illuminated. For convenience, all of the electrical conductors 18 and 19 may be combined into a single cable leading from the mannekin 10 to a suitable cabinet, not shown, containing the components of the electrical circuit show in FIG. 1 but it is not considered necessary or desirable to show this multiple cable in the drawings.

The electric circuit shown in FIG. 1 comprises the following elements: electric glow lamp 1 for each cell, switch 2 for each lamp 1, and relay 3 and a variable resistor in series with each lamp 1 for purposes of adjustment. Closing of the switch 2 operates the relay 3 which is connected with a holding circuit, i.e. upon the opening of the contact of switch 2 the relay 3 remains closed. Contact 3a of relay 3 connects lamp 1 to a stabilized voltage supply source 5. Instrument 6 indicates the total current consumed from the supply source by the lamps 1 and thereby provides an indication of the number of the cells which are illuminated and thus indicates the absolute and relative burn area proportionate to the total area and corresponding to the size and configuration of the burn area. Instrument 6 is provided with suitable scales calibrated in absolute and relative square units. An ammeter may be used as such an instrument.

The illuminated areas of the mannequin may be extinguished by a momentary de-energizing of the power supply by means of switch 7 which opens the relays 3; after that the unit is again ready for operation.

In utilizing the apparatus of this invention the burn area on the patient's body is visually observed and a corresponding area or areas 20 and 21 are outlined on the surface of the mannekin 10. The lamps 1 in the cells 15 underlying the outlined area or areas 20 and 21 are energized by manually operating the appropriate members 17 to actuate the associated switches 2 to illuminate such area and visual inspection serves to determine whether or not the entire area is illuminated.

Assuming that the illuminated area corresponds to the burn area on the patient, the total current consumed by the lamps 1 which have been energized provides an exact indication as to the number of lamps illuminated and since the surface overlying each cell 15 is of equal area, the sum of the illuminated areas represents the area of the burned portion and this latter area may be compared to the total area of the body to determine the percentage of the body area which is burned.

The ammeter 6 utilized to measure the current drain of the lamps 1 may be calibrated to provide direct readings of the results in terms of body area, thus precluding the necessity for making calculations.

It should be noted that this invention makes it possible to obtain necessary data as to affected burn areas in a minimum period of time and with greater precision than was heretofore possible.

It will be obvious to those skilled in the art that various changes may be made in the invention without departing from the spirit and scope thereof and therefore the invention is not limited by that which is shown in the drawing and described in the specification, but only as indicated in the appended claims.

What we claim is:

1. An apparatus for determining the extent of burn area on the human body, said apparatus comprising a hollow mannequin of transparent material, opaque partitions in said mannequin providing cells to divide the external surface thereof into a plurality of equal unit areas with a cell inwardly of each, a lamp disposed in each cell, a source of electric current, individual switch means connected to each lamp and said source to permit selectively energizing each lamp, and means to indicate the total current drain of any lamps selectively energized, whereby the number of lamps energized and, therefore, the number of unit areas illuminated may be calculated as a function of said total current drain.

2. An apparatus as defined in claim 1 in which the means to indicate total current drain comprises an ammeter, said ammeter being calibrated to directly indicate the total area illuminated.

References Cited by the Examiner

UNITED STATES PATENTS

| | | | |
|---|---|---|---|
| 2,669,986 | 2/1954 | Crawley | 128—2.1 |
| 2,781,611 | 2/1957 | Bills | 46—135 |
| 3,085,566 | 4/1963 | Tolles | 128—2.1 |
| 3,111,608 | 11/1963 | Boenning | 128—2.1 |

RICHARD A. GAUDET, *Primary Examiner.*

RICHARD C. PINKHAM, *Examiner.*

S. BRODER, *Assistant Examiner.*